(12) United States Patent
Takamoto

(10) Patent No.: US 9,058,133 B2
(45) Date of Patent: Jun. 16, 2015

(54) CONTROL DEVICE, CONTROL METHOD FOR A CONTROL DEVICE, AND RECORDING MEDIUM

(75) Inventor: Akio Takamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 477 days.

(21) Appl. No.: 13/036,674

(22) Filed: Feb. 28, 2011

(65) Prior Publication Data

US 2011/0216346 A1 Sep. 8, 2011

(30) Foreign Application Priority Data

Mar. 8, 2010 (JP) ................................ 2010-050402

(51) Int. Cl.
G06F 15/00 (2006.01)
G06F 3/12 (2006.01)
G06F 9/00 (2006.01)

(52) U.S. Cl.
CPC ... *G06F 3/12* (2013.01); *G06F 9/00* (2013.01)

(58) Field of Classification Search
USPC ........................................................ 358/1.14
See application file for complete search history.

(56) References Cited

U.S. PATENT DOCUMENTS 5,961,624 A 10/1999 Takayama
6,122,073 A * 9/2000 Miyasaka et al. ............. 358/434
6,369,906 B1 * 4/2002 Nakao ........................... 358/1.15
2005/0242178 A1 * 11/2005 Minowa ........................ 235/383
2005/0271446 A1 * 12/2005 Minowa ........................ 400/621
2007/0124617 A1 * 5/2007 Takamoto ..................... 713/310
2009/0292833 A1 11/2009 Kondo

FOREIGN PATENT DOCUMENTS

| JP | 07-287643 | 10/1995 |
|---|---|---|
| JP | 08-328991 | 12/1996 |
| JP | 09-006705 | 1/1997 |
| JP | 2000-284977 | 10/2000 |
| JP | 2004-017484 A | 1/2004 |
| JP | 2008-293181 | 12/2008 |
| JP | 2009-282784 | 12/2009 |

* cited by examiner

*Primary Examiner* — Helen Q Zong

(57) ABSTRACT

When a communication port is occupied by a recording control unit, the communication port can be released as needed without causing an error or problem. A communication control unit 16 has a decision unit 44 that determines whether or not the USB port 18 can be released from the recording control unit 42 based on control commands input from the recording control unit 42 when the USB port 18 is occupied by the recording control unit 42 and an access request for the USB port 18 is received from another device, and a releasing unit 45 that releases the USB port 18 from the recording control unit 42 when the decision unit 44 determines that the USB port 18 can be released from the recording control unit 42.

10 Claims, 4 Drawing Sheets

CONTROL DEVICE, CONTROL METHOD FOR A CONTROL DEVICE, AND RECORDING MEDIUM

This application claims priority under 35 U.S.C. §119 to Japanese Patent Application No. 2010-050402 filed on Mar. 8, 2010, the entire disclosure of which is expressly incorporated by reference herein.

BACKGROUND

1. Technical Field

The present invention relates to a control device that is connected to a recording device through a communication port, to a control method for this control device, and to a recording medium that records a program for controlling the control device.

2. Related Art

Control devices (information processing devices) that connect to a recording device through a USB (Universal Serial Bus) port or other type of communication port are known from the literature. See, for example, Japanese Unexamined Patent Appl. Pub. JP-A-2008-293181.

Such control devices have a recording control unit that outputs control commands for controlling the recording device by reading and executing a specific application or printer driver, for example. The control data output by the recording control unit is output to the recording device through the communication port, and the recording device executes the instructed recording operations based on the received control data.

Depending upon the type or specifications of the application or printer driver, some recording control units communicate with the recording device after first occupying the communication port, and continue to occupy the communication port even when not communicating. In this case, a control unit executing another application cannot communicate through the communication port with the recording device while the recording control unit continues occupying the communication port. If a request for the communication port asserted from a control unit executing another application is able to force release of the communication port in order to solve this problem, the recording control unit will be forced to release the communication port, possibly resulting in other problems.

SUMMARY

When the communication port is occupied by a recording control unit, at least one of embodiment of the invention enables releasing the communication port as required without causing a problem.

A first aspect of the invention is a control device including: at least one recording control unit that generates and outputs a control command for controlling a recording device; another recording control unit; a communication port to which the recording device is connected and which outputs a control command input from the communication control unit to the recording device; and a communication control unit that outputs control commands input from the recording control unit and the other recording control unit to the communication port. The communication control unit includes a decision unit that, when the communication port is occupied by the recording control unit and a communication port access request is received from the other recording control unit, determines if the communication port can be released from the recording control unit based on the status of control command input from the recording control unit; and a communication port releasing unit that releases the communication port from the recording control unit when the decision unit determines that the communication port can be released from the recording control unit.

When the recording control unit occupies the communication port and a communication port access request is then asserted from another recording control unit, this aspect of the invention determines based on the control commands input from the recording control unit whether or not the communication port can be released from the recording control unit, and releases the communication port when releasing the port is determined possible.

Because whether or not the communication port can be released from the recording control unit is thus determined based on the control commands output from the recording control unit, whether or not the communication port can be released can be appropriately determined with consideration for the current state of the recording control unit, and the communication port can be released from the recording control unit based on the result of this appropriate decision. As a result, the occurrence of problems caused by unconditionally releasing the communication port from the recording control unit can be prevented while enabling releasing the communication port from the recording control unit as appropriate so that other recording control units can send control commands to and control the recording device. After the other recording control unit temporarily occupies and uses the communication port, the communication port is released so that the recording control unit can use the communication port.

In a control device according to another aspect of the invention, the decision unit determines that the communication port can be released from the recording control unit when the recording control unit is not outputting control commands to the recording device.

In this aspect of the invention the decision unit determines that the communication port can be released from the recording control unit and the port is released unless a sequence of control commands for executing a recording operation on the recording device are being output. Problems caused by unconditionally releasing the communication port from the recording control unit can therefore be prevented while releasing the communication port from the recording control unit as appropriate.

In a control device according to another aspect of the invention, the decision unit determines that the communication port can be released from the recording control unit when a specified time has passed since input of the last control command from the recording control unit.

When a specific time has passed since the last control command was input from the recording control unit to the communication control unit, and the likelihood of a following control command being input is low, the decision unit in this aspect of the invention determines that the communication port can be released from the recording control unit and the communication port is released. Problems caused by unconditionally releasing the communication port from the recording control unit can therefore be prevented while releasing the communication port from the recording control unit as appropriate.

In a control device according to another aspect of the invention, the recording device has an image recording unit and a cutting device, and issues a receipt by recording an image on paper by the image recording unit and then cutting the paper by the cutting device; and the decision unit determines that the communication port can be released from the recording control unit when not in a period after a control command that instructs starting recording on the paper is input and before a control command that instructs cutting the paper is input from the recording control unit.

When the recording device is used for issuing receipts by recording an image on roll paper, for example, and then cutting the roll paper, the last control command in the sequence of control commands related to issuing a receipt is a control command to cut the roll paper.

Therefore, when a next control command has not been input after the control command for cutting the roll paper is input from the recording control unit, and the likelihood is high that a control command sequence for executing a receipt issuing operation is not in the middle of being output, the decision unit in this aspect of the invention determines that the communication port can be released from the recording control unit and the port is released. Problems caused by unconditionally releasing the communication port from the recording control unit can therefore be prevented while releasing the communication port from the recording control unit as appropriate.

In a control device according to another aspect of the invention, the decision unit determines that the communication port can be released from the recording control unit during a specific predetermined time.

This predetermined specific period is a period that can be previously defined as a time when the recording control unit does not control the recording device, or a time when releasing the communication port from the recording control unit is allowed, such as the period until a specific time has passed after the power is turned on, or a predetermined period of time during the day.

The decision unit in this aspect of the invention thus determines that the communication port can be released from the recording control unit during this previously determined period of time, and the port is released. Problems caused by unconditionally releasing the communication port from the recording control unit can therefore be prevented while releasing the communication port from the recording control unit as appropriate.

In a control device according to another aspect of the invention, the recording control unit stops control command output when the recording device is busy or offline; and the communication port releasing unit releases the communication port from the recording control unit by generating and outputting to the recording control unit a dummy command indicating that the recording device is busy or offline.

By outputting to the recording control unit a dummy command indicating that the recording device is busy or offline, control of the recording device by the recording control unit is stopped and the communication port can be appropriately released from the recording control unit.

In a control device according to another aspect of the invention, the communication port releasing unit enables control command output by the recording control unit by generating and outputting to the recording control unit a command indicating that the busy or offline state of the recording device was cancelled.

Further preferably in a control device according to another aspect of the invention, the other recording control unit generates a control command related to recording device maintenance.

Further preferably in a control device according to another aspect of the invention, the recording device is a printer; and the recording control unit generates control commands related to printing by the printer.

Another aspect of the invention is a control method for a control device that has at least one recording control unit that generates and outputs a control command for controlling a recording device, another recording control unit, a communication port to which the recording device is connected and which outputs a control command input from the communication control unit to the recording device, and a communication control unit that outputs control commands input from the recording control unit and the other recording control unit to the communication port. The control method includes steps of: determining by the communication control unit if the communication port can be released from the recording control unit based on the status of control command input from the recording control unit when the communication port is occupied by the recording control unit and a communication port access request is received from the other recording control unit; and releasing the communication port from the recording control unit by the communication control unit when the decision unit determines that the communication port can be released from the recording control unit.

When the recording control unit occupies the communication port and a communication port access request is then asserted from another recording control unit, the control method according to this aspect of the invention determines based on the control commands input from the recording control unit whether or not the communication port can be released from the recording control unit, and releases the communication port when releasing the port is determined possible.

Because whether or not the communication port can be released from the recording control unit is thus determined based on the control commands output from the recording control unit, whether or not the communication port can be released can be appropriately determined with consideration for the current state of the recording control unit, and the communication port can be released from the recording control unit based on the result of this appropriate decision. As a result, the occurrence of problems caused by unconditionally releasing the communication port from the recording control unit can be prevented while enabling releasing the communication port from the recording control unit as appropriate so that other recording control units can send control commands to and control the recording device. After the other recording control unit temporarily occupies and uses the communication port, the communication port is released so that the recording control unit can use the communication port.

Further preferably in a control method for a control device according to another aspect of the invention, the determining step determines that the communication port can be released from the recording control unit when the recording control unit is not outputting control commands to the recording device.

In a control method for a control device according to another aspect of the invention, the determining step determines preferably that the communication port can be released from the recording control unit when a specified time has passed since input of the last control command from the recording control unit.

Further preferably in a control method for a control device according to another aspect of the invention, the recording device has an image recording unit and a cutting device, and issues a recorded slip by recording an image on paper by the image recording unit and then cutting the paper by the cutting device; and the determining step determines that the communication port can be released from the recording control unit when not in a period after a control command that instructs starting recording on the paper is input and before a control command that instructs cutting the paper is input from the recording control unit.

In a control method for a control device according to another aspect of the invention, the determining step preferably determines that the communication port can be released from the recording control unit during a specific predetermined time.

In a control method for a control device according to another aspect of the invention, the recording control unit preferably stops control command output when the recording device is busy or offline; and the communication port is released from the recording control unit by generating and outputting to the recording control unit a dummy command indicating that the recording device is busy or offline.

Further preferably in a control method for a control device according to another aspect of the invention, control command output by the recording control unit is enabled by generating and outputting to the recording control unit a command indicating that the busy or offline state of the recording device was cancelled.

In a control method for a control device according to another aspect of the invention, the other recording control unit preferably generates a control command related to recording device maintenance.

Further preferably in a control method for a control device according to another aspect of the invention, the recording device is a printer; and the recording control unit generates control commands related to printing by the printer.

Another aspect of the invention is a recording medium that can be read by a control device and stores a program that is executed by a control unit to control a control device having a communication port to which a recording device can be connected, wherein the program causes the control unit to function as: a recording control unit that outputs control commands for controlling the recording device; and a communication control unit that includes a decision unit that, when a control command input from the recording control unit is output to the communication port and the communication port is occupied by the recording control unit, and a communication port access request is received from another device, determines if the communication port can be released from the recording control unit based on the status of control command input from the recording control unit; and a communication port releasing unit that releases the communication port from the recording control unit when the decision unit determines that the communication port can be released from the recording control unit.

When the recording control unit occupies the communication port and a communication port access request is then asserted from another recording control unit, the control method according to this aspect of the invention determines based on the control commands input from the recording control unit whether or not the communication port can be released from the recording control unit, and releases the communication port when releasing the port is determined possible.

Because whether or not the communication port can be released from the recording control unit is thus determined based on the control commands output from the recording control unit, whether or not the communication port can be released can be appropriately determined with consideration for the current state of the recording control unit, and the communication port can be released from the recording control unit based on the result of this appropriate decision. As a result, the occurrence of problems caused by unconditionally releasing the communication port from the recording control unit can be prevented while enabling releasing the communication port from the recording control unit as appropriate so that other recording control units can send control commands to and control the recording device.

The recording medium may be a hard disk drive or other stationary device, or a removable disc.

Effect of at Least One of Embodiment of the Invention

When the communication port is occupied by the recording control unit, at least one of embodiment of the invention can thus release the communication port as required without creating a problem, and another recording control unit can temporarily use the communication port.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
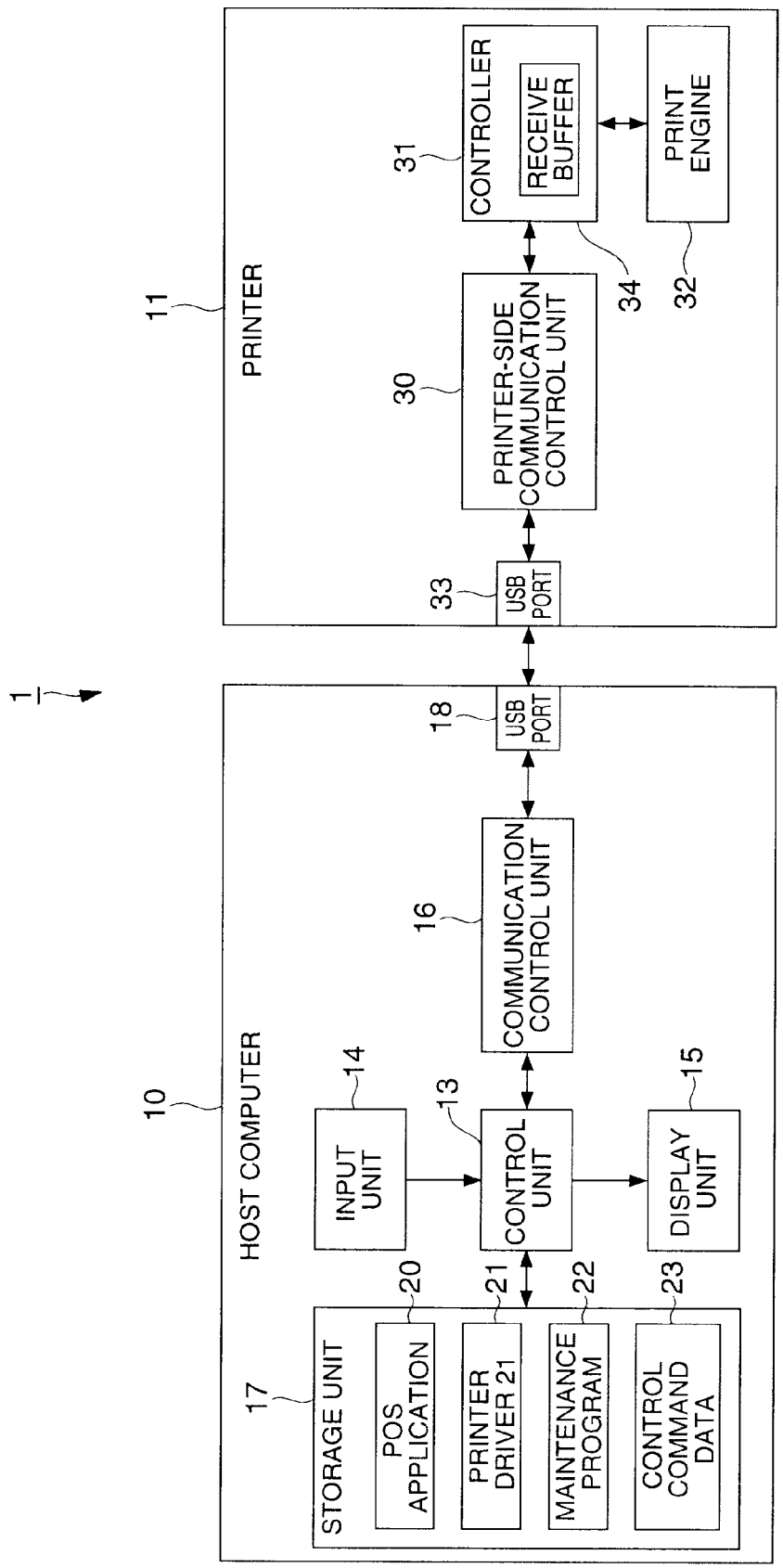
FIG. 1 is a block diagram showing the configuration of a printing system according to a preferred embodiment of the invention.

FIG. 1 is a block diagram showing the configuration of a printing system 1 according to a preferred embodiment of the invention.

Figure 2:
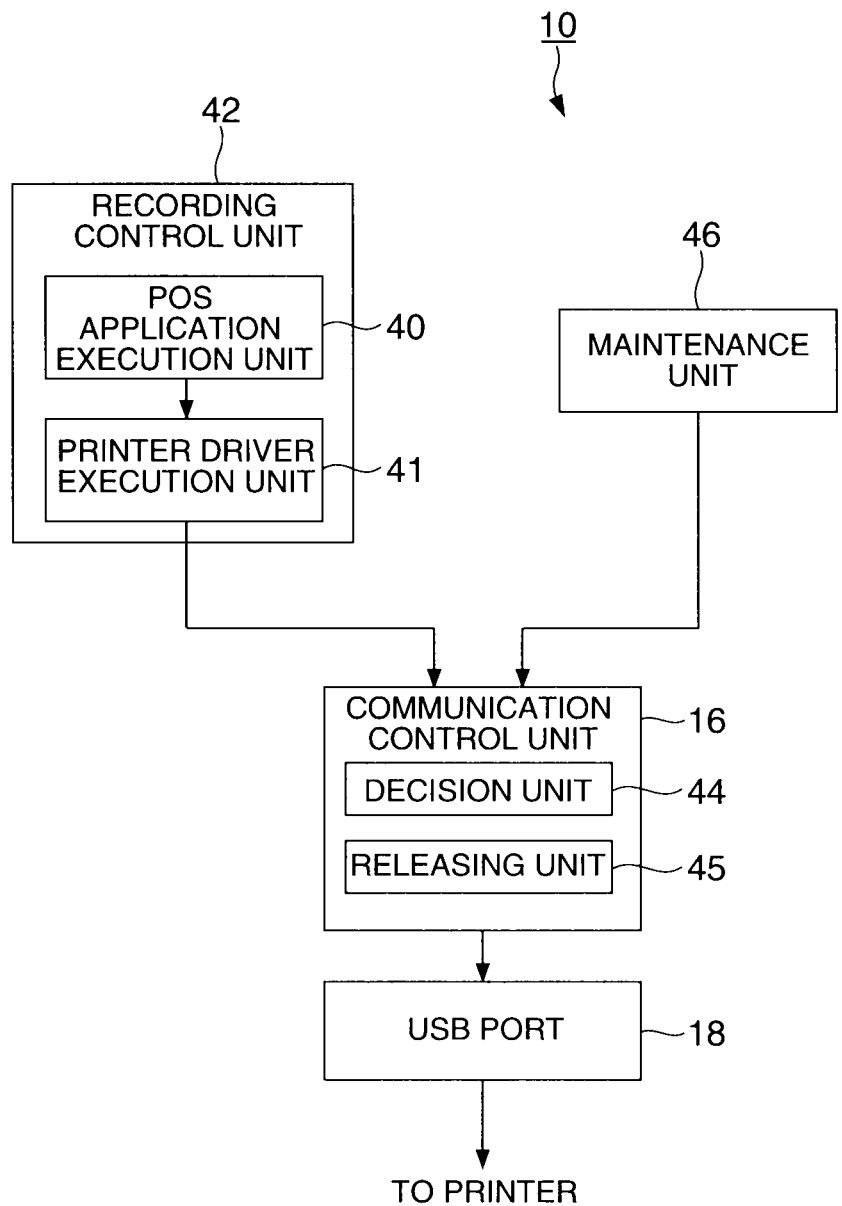
FIG. 2 is a block diagram of the functional configuration of a host computer.

As shown in FIG. 2, the printing system 1 includes a host computer 10 and a printer 11 that is communicably connected to the host computer 10.

The host computer 10 is, for example, a POS terminal device that is installed in a retail store, for example, and runs a point-of-sale management system (POS system) that executes sales and transaction processes, and issues a receipt for each sale transaction by the printer 11. A barcode scanner for reading product barcodes during the sales process, and a cash drawer that stores cash for processing transactions, and other peripherals are typically connected to the host computer 10, but these other units are not shown in the figures and description thereof is omitted below. In addition, issuing a receipt involves recording information about the products purchased in the transaction and specific images such as a store logo or store information on roll paper, and then cutting the roll paper to create a single receipt.

The host computer 10 used as the control device in this embodiment of the invention includes a control unit 13, an input unit 14, a display unit 15, a communication control unit 16, and a storage unit 17.

The control unit 13 is the central control device of the host computer 10, and includes a CPU that executes programs, ROM that stores the basic control program executed by the CPU, RAM that is used as working memory for temporarily storing process data and the programs executed by the CPU, and other peripheral circuitry. The control unit 13 can also execute various clock operations, and in particular keeps the current date and time.

The input unit 14 is connected to input devices such as a keyboard having an enter key and other keys that are operated by the operator, a mouse, barcode scanner, and card reader, detects operation of the input devices, and outputs the detected operations as operating signals to the control unit 13.

The display unit 15 includes a display panel such as a LCD device, and displays information such as the process content of the sales process and transact ion process on the display panel as control led by the control unit 13.

The communication control unit 16 controls communication according to a defined protocol with the printer 11 connected to the Universal Serial Bus (USB) port 18. The communication control unit 16 is further described below.

The storage unit 17 includes a hard disk or nonvolatile memory such as flash memory, and rewritably stores data. In addition to the host computer 10 operating system and a registry storing settings related to the operation of the operating system, a POS application 20 having the functions for running the sales process and transaction process of the POS system, a printer driver 21 having the functions for controlling the printer 11, a maintenance program 22 described below, and control command data 23 are also stored in the storage unit 17.

The communication port in this embodiment of the invention is a USB port 18, but depending upon the printer 11 specifications could be a specific COM port, parallel port, or Ethernet (R) port, for example.

The printer 11 used as the recording device in this embodiment of the invention is a thermal line printer that conveys thermal roll paper, which is thermal recording paper wound in a roll, by a transportation mechanism (not shown), records monochrome or color text and images by transferring heat by a line thermal head (not shown) to the recording surface of the thermal roll paper, and cuts the thermal roll paper at a specific position by a cutter mechanism (not shown) to issue a receipt as controlled by the host computer 10. While a thermal line printer is used in this embodiment of the invention, a printer using a different recording method, such as an inkjet printer, could be used instead.

As shown in FIG. 1, the printer 11 includes a printer-side communication control unit 30, a controller 31, and a print engine 32.

The printer-side communication control unit 30 controls communication with the host computer 10 connected through the USB port 33 according to a defined protocol.

The controller 31 controls printer 11 operations according control commands received from the host computer 10 through the printer-side communication control unit 30.

The receive buffer 34 temporarily stores data and control commands received from the host computer 10.

The print engine 32 records on the thermal roll paper using parts including the line thermal head, transportation mechanism, and cutter mechanism described above.

FIG. 2 schematically describes the functional configuration of the host computer 10.

The POS application execution unit 40 acquires the information to be printed on the receipt for each transaction, including information describing the purchased products, product price information, and information indicating the transaction total, and generates and outputs the print data for the image to be recorded on the receipt based on the acquired information to the printer driver execution unit 41 by executing the POS application 20.

By executing the printer driver 21, the printer driver execution unit 41 generates control commands according to the command system of the printer 11 based on the print data input from the POS application 20, and outputs to the communication control unit 16.

These control commands are described below using a control command causing the printer 11 to issue a receipt as an example. A control command for issuing a receipt is created according to a predetermined format, and includes control codes such as a control code causing the transportation mechanism to convey the thermal roll paper, a control code for driving the line thermal head, and a control code causing the cutter mechanism to cut the thermal roll paper, and data associated with each control code.

In this embodiment of the invention the POS application execution unit 40 and printer driver execution unit 41 work together and function as a recording control unit 42. The recording control unit 42 may have a plurality of applications, such as an application for issuing coupons, in addition to the POS application execution unit 40, and can execute processes for any of the applications.

The communication control unit 16 functions as a communication port driver that controls communication with the external device connected to the USB port 18, and based on the protocol corresponding to the USB port 18 segments the control commands input from the printer driver 21 to packets of a specific size, and outputs through the USB port 18 to the printer 11.

In this embodiment of the invention the communication control unit 16 has a function for detecting if the printer 11 is offline or busy by monitoring the status of communication with the printer 11, a function for outputting to the recording control unit 42 a command indicating that the printer 11 is offline or busy when such a state is detected, and a function for outputting to the recording control unit 42 a command indicating that the printer 11 is no longer offline or busy when the offline or busy state is cancelled.

Offline as used herein means that the connection enabling communication between the printer 11 and host computer 10 is interrupted. Busy as used herein means that the printer 11 cannot be controlled because of a receive buffer 34 overflow, for example.

When a command indicating that the printer 11 is offline or busy is input from the communication control unit 16, the recording control unit 42 stops control command output and temporarily stops controlling the printer 11. The recording control unit 42 resumes printer 11 control after a command indicating that the printer 11 is no longer offline or busy is input from the communication control unit 16.

The communication control unit 16 includes a decision unit 44 and releasing unit 45 as described further below.

The maintenance unit 46 (other recording control unit) functions as described below by executing the maintenance program 22.

Based on operator commands, the maintenance unit 46 outputs control commands according to the command system of the printer 11 to the printer 11, causes the printer 11 to perform a maintenance operation such as a print test, and stores various settings in the printer 11. Storing settings in the printer 11 means storing the print speed setting, recording density, and the width of the thermal roll paper when the printer 11 is configured to enable storing such settings internally, and when font data and logo images are stored in the printer 11 and the printer 11 uses this font data and logo images for recording, storing the printer 11 settings includes storing and changing the font data and logo image content.

Instructions to start the maintenance operation and register the settings can be issued using functions of the maintenance program 22 by the operator operating a mouse, keyboard, or other input device connected to the input unit 14 while referring to content displayed on the display device of the display unit 15, for example.

In addition to a program for storing settings, the maintenance program 22 may also include a plurality of other programs, such as programs for acquiring maintenance counts such as the number of lines printed by the printer 11, and reporting when parts need to be replaced or lubrication or cleaning are needed.

When the recording control unit 42 controls the printer 11 in this embodiment of the invention, the recording control unit 42 controls the printer 11 after the USB port 18 is first occupied by the recording control unit 42 and a communication link is established between the recording control unit 42 and the printer 11.

This is because in order to monitor the status of the printer 11 connected to the USB port 18, the recording control unit 42 is configured to output a status request at a specific timing to the printer 11, and detect based on the response to the status request from the printer 11 whether the printer 11 status is that it is operating normally, or whether the cover of the thermal roll paper storage compartment is open, for example. In addition, when a printer 11 error occurs, a command corresponding to the error is output from the printer 11 to the recording control unit 42, and a communication link between the recording control unit 42 and printer 11 must always be open.

Note that the communication port being occupied by the recording control unit 42 means that the USB port 18 is opened for use only by the recording control unit 42 using a function of the communication control unit 16 according to the specifications of the POS application 20 and printer driver 21, and only control commands output by the recording control unit 42 can be output through the USB port 18 to the printer 11 connected to the USB port 18.

While the recording control unit 42 is controlled the printer 11 in this configuration, the USB port 18 is occupied by the recording control unit 42, the maintenance unit 46 cannot output control commands through the USB port 18 to the printer 11, and the maintenance unit 46 cannot function as described above. However, maintenance operations may need to be executed or printer settings may need to be changed or set even while the printer 11 is being controlled by the recording control unit 42. Considering this, the communication control unit 16 could therefore be configured to unconditionally release the USB port 18 from the recording control unit 42 when a control command is input from the maintenance unit 46. However, if the USB port 18 is released from the recording control unit 42 while the recording control unit 42 is outputting a control command sequence for issuing one receipt, the control commands will not be input correctly to the printer 11, and an error could occur as a result.

This embodiment of the invention is therefore configured so that the USB port 18 can be released from the recording control unit 42 without causing a problem if a control command is input from the maintenance unit 46 while the USB port 18 is occupied by the recording control unit 42.

This configuration is described below through the following description of the decision unit 44 and releasing unit 45 in the communication control unit 16.

When the USB port 18 is occupied by the recording control unit 42 and a control command is input from the maintenance unit 46, that is, when a USB port 18 access request is asserted, the decision unit 44 of the communication control unit 16 determines based on the control commands input from the recording control unit 42 to the communication control unit 16 if the USB port 18 can be released from the recording control unit 42.

The communication control unit 16 therefore stores the input control commands related to data indicating the date and time each control command was input in the storage unit 17 as control command data 23 (FIG. 1) each time a control command is input from the recording control unit 42. Control commands previously input from the recording control unit 42 are therefore stored correlated to data indicating the date and time the control commands were input.

Figure 3:
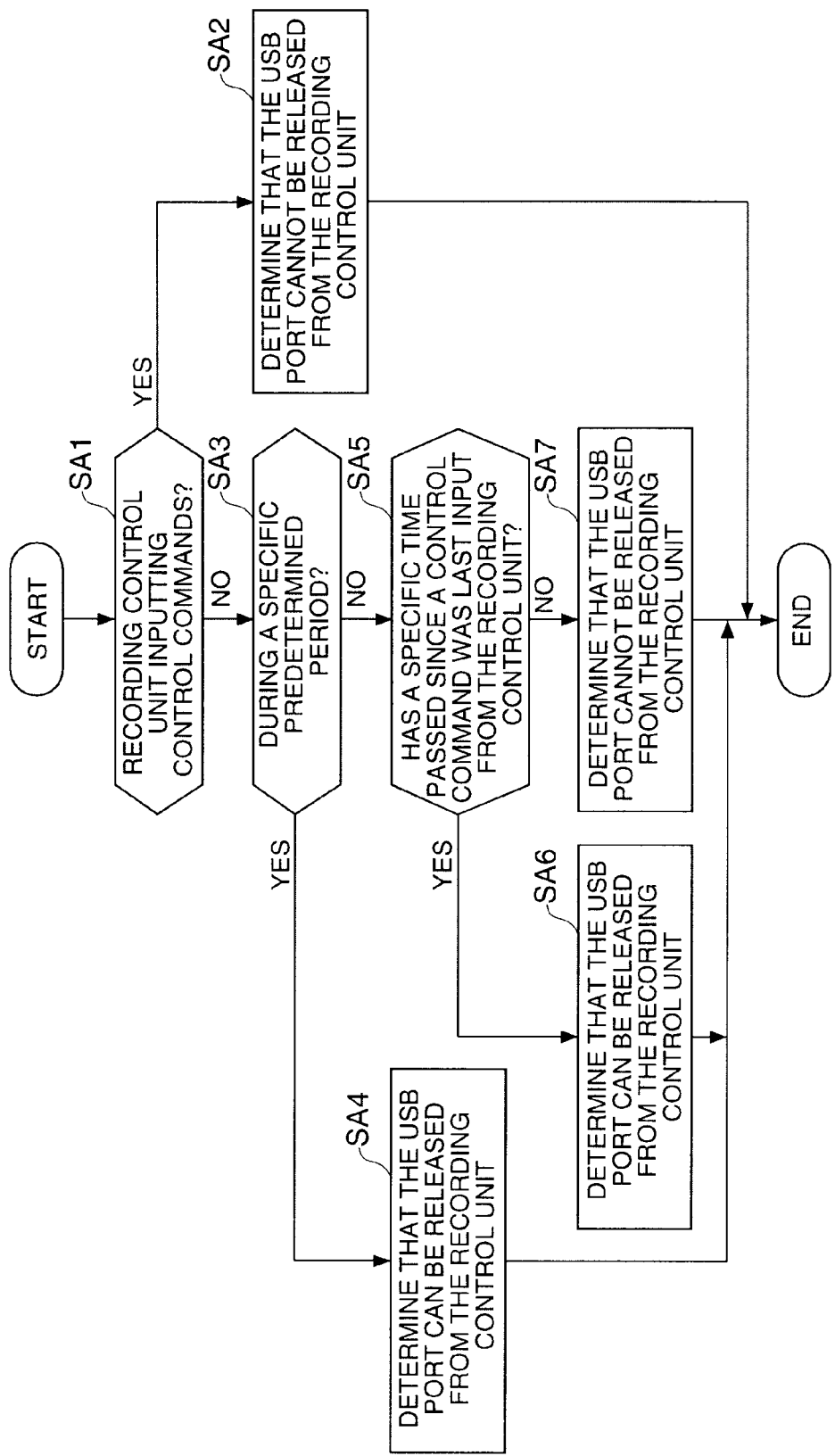
FIG. 3 is a flow chart showing the operation of the decision unit.

FIG. 3 is a flow chart describing the operation of the decision unit 44.

When a control command is input from the maintenance unit 46 while the USB port 18 is occupied by the recording control unit 42, the decision unit 44 determines if control commands are being input from the recording control unit 42 (step SA1). If commands are being input (step SA1 returns Yes), the decision unit 44 determines that the USB port 18 cannot be released from the recording control unit 42 (step SA2). Because the decision unit 44 thus determines that the USB port 18 cannot be released during control command input, the releasing unit 45 is prohibited from forcibly releasing the USB port 18 during control command input, and creating a new problem is prevented.

However, if control commands are not being input (step SA1 returns No), the decision unit 44 determines if the current time is within a predetermined specific period (step SA3). If the current time is during this predetermined specific period (step SA3 returns Yes), the decision unit 44 determines that the USB port 18 can be released from the recording control unit 42 (step SA4).

This predetermined specific period is a time that is previously defined as a period in which the USB port 33 will not be controlled by the printer-side communication control unit 30 in order to reserve sufficient time for printer 11 maintenance, for example, or as a period in which the USB port 18 can be released from the recording control unit 42. Examples of such times are the period until a specific time has passed after the power is turned on, and a predetermined period of time during the day. By determining that the USB port 18 can be released from the recording control unit 42 when a control command is input from the maintenance unit 46 during this predetermined period, problems caused by unconditionally releasing the communication port can be prevented, and occupation of the USB port 18 by the recording control unit 42 can be cancelled appropriately.

However, if the current time is outside of this predetermined specific period (step SA3 returns No), the decision unit 44 references the control command data 23 stored in the storage unit 17, and determines if a specific time has passed since the last control command from the recording control unit 42 was input (step SA5).

If the specific time has passed since the last control command was input (step SA5 returns Yes), the decision unit 44 determines that the USB port 18 can be released from the recording control unit 42 (step SA6). However, if the specific time since the last control command was input has not passed (step SA5 returns No), the decision unit 44 determines that the USB port 18 cannot be released from the recording control unit 42 (step SA7).

The decision unit 44 according to this embodiment of the invention thus determines that the USB port 18 can be released from the recording control unit 42 when a specific time has passed since a control command was last input, and determines that occupation of the USB port 18 by the recording control unit 42 cannot be cancelled if the specific time since a control command was last input has not passed, for the following reason.

That is, this specific time is set in this embodiment of the invention so that if the specific time has passed since a control command was last input, it can be determined that receipts are not being frequently issued and the likelihood that a following control command will be input from the recording control unit 42 is low. By deciding if the communication port can be released based on these criteria, interrupting receipt output when the printer 11 is frequently required to print receipts can therefore be prevented.

In this embodiment of the invention the decision unit 44 determines that the USB port 18 cannot be released from the recording control unit 42 (step SA7) when the specific time since a control command was last input has not passed (step SA5 returns No). However, when the specific time since a control command was last input has not passed, the decision unit 44 could wait for another specific time, determine that the USB port 18 cannot be released from the recording control unit 42 if a control command is input during this waiting time, and determine that the USB port 18 can be released from the recording control unit 42 if this specific time passes without a control command being input while waiting.

The releasing unit 45 is described next.

When a control command is input from the maintenance unit 46 while the USB port 18 is occupied by the recording control unit 42, and the decision unit 44 has determined that the USB port 18 can be released from the recording control unit 42, the releasing unit 45 releases the USB port 18.

More specifically, the releasing unit 45 in this case releases the recording control unit 42 from being occupied by the recording control unit 42, makes the USB port 18 available to the maintenance unit 46, and enables outputting control commands input from the maintenance unit 46 through the USB port 18 to the printer 11. The releasing unit 45 also outputs a dummy command to the recording control unit 42 indicating that the printer 11 is offline (or busy), thereby stopping output of control commands by the recording control unit 42.

When output of control commands input from the maintenance unit 46 to the printer 11 is completed, the releasing unit 45 also outputs to the recording control unit 42 a command indicating that the offline (or busy) status of the printer 11 was cancelled. Triggered by this command, the recording control unit 42 resumes outputting control commands to the printer 11.

The operation of the host computer 10 is described next using the flow chart in FIG. 4.

Figure 4:
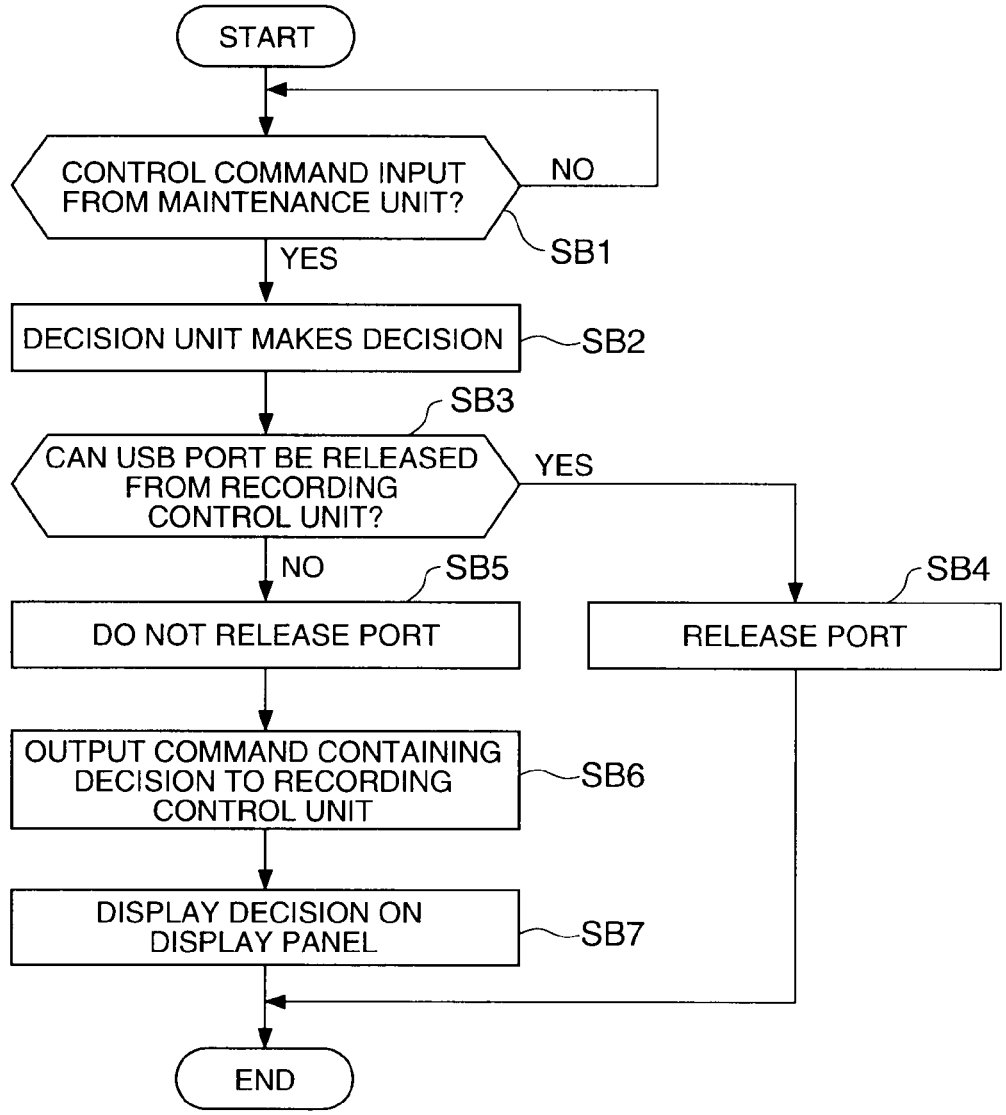
FIG. 4 is a flow chart showing the operation of the host computer.

Note that the operation shown in the flow chart in FIG. 4 is premised on the the USB port 18 being occupied by the recording control unit 42.

The communication control unit 16 of the host computer 10 looks for input of control commands from the maintenance unit 46 (step SB1). If a control command is input from the maintenance unit 46 (step SB1 returns Yes), the decision unit 44 determines if occupation of the USB port 18 by the recording control unit 42 can be cancelled (step SB2).

If the decision is that the USB port 18 can be released (step SB3 returns Yes), the releasing unit 45 releases the USB port 18 from occupation by the recording control unit 42 (step SB4).

If the USB port 18 cannot be released (step SB3 returns No), the releasing unit 45 does not release the USB port 18 (step SB5). The communication control unit 16 then outputs to the recording control unit 42 a command indicating that the USB port 18 was not released from the recording control unit 42, and the printer 11 cannot be controlled by the maintenance unit 46 (step SB6). Triggered by input of this command, the POS application execution unit 40 displays an appropriate message on the display unit 15 to inform the operator (step SB7).

As described above, the communication control unit 16 in this embodiment of the invention has a decision unit 44 that, when the USB port 18 is occupied by the recording control unit 42 and a control command is input from the maintenance unit 46 (a request to access the port is input), determines based on the control command input from the recording control unit 42 if the USB port 18 can be released from occupation by the recording control unit 42, and a releasing unit 45 that releases the USB port 18 from the recording control unit 42 when the decision unit 44 determines that occupation of the USB port 18 by the recording control unit 42 can be cancelled.

As a result, when a request for the USB port 18 is output by the maintenance unit 46 while the USB port 18 is occupied by the recording control unit 42, whether or not the USB port 18 can be released from the recording control unit 42 is determined based on the control commands input from the recording control unit 42, and the USB port 18 is released if it can be released. Because whether or not the USB port 18 can be released from the recording control unit 42 is determined based on the control commands input from the recording control unit 42, whether or not the USB port 18 can be released can be determined appropriately according to the status of the recording control unit 42, and the USB port 18 can be released from the recording control unit 42 based on the result of this appropriate decision. As a result, the occurrence of problems caused by forcibly releasing the USB port 18 from the recording control unit 42 can be prevented while also releasing the USB port 18 from the recording control unit 42 as appropriate.

When the recording control unit 42 is not outputting a series of control commands controlling printing by the printer 11 in this embodiment of the invention, the decision unit 44 determines that the USB port 18 can be released from the recording control unit 42.

The decision unit 44 thus determines that the USB port 18 can be released from the recording control unit 42 when a control command sequence controlling the recording operation of the printer 11 is not being output, the USB port 18 is thus released, and problems resulting from unconditionally releasing the USB port 18 from the recording control unit 42 are prevented while the USB port 18 can be appropriately released from the recording control unit 42.

When a specific time has passed since a control command was last input from the recording control unit 42, the decision unit 44 in this embodiment of the invention determines that the USB port 18 can be released from the recording control unit 42.

As a result, when the specific time has passed since a control command was last input from the recording control unit 42 to the communication control unit 16 and the likelihood that a following command will be input is low, the decision unit 44 determines that the USB port 18 can be released from the recording control unit 42 and the port is released. Problems caused by unconditionally releasing the USB port 18 from the recording control unit 42 can therefore be prevented while also appropriately releasing the USB port 18 from the recording control unit 42.

The decision unit 44 in this embodiment of the invention also determines that the USB port 18 can be released from the recording control unit 42 during specific predetermined times.

As a result, the decision unit 44 determines that the USB port 18 can be released from the recording control unit 42 during these specific predetermined times, and the port is released. Problems caused by unconditionally releasing the USB port 18 from the recording control unit 42 can therefore be prevented while also appropriately releasing the USB port 18 from the recording control unit 42.

In addition, the releasing unit 45 in this embodiment of the invention releases the USB port 18 from the recording control unit 42 by outputting a dummy command indicating that the printer 11 is offline or busy to the recording control unit 42.

As a result, control of the printer 11 by the recording control unit 42 is stopped by outputting to the recording control unit 42 a dummy command indicating that the printer 11 is busy or offline, and the USB port 18 can be appropriately released from the recording control unit 42. Furthermore, because control of the printer 11 by the recording control unit 42 can be stopped using an existing command, development can be simplified.

Another embodiment of the invention is described below.

For example, the control command described in the foregoing embodiment is a command for issuing a receipt created according to a predetermined format, and includes control codes such as a control code causing the transportation mechanism to convey the thermal roll paper, a control code for driving the line thermal head, and a control code causing the cutter mechanism to cut the thermal roll paper, and data associated with each control code.

In this embodiment of the invention, the control command sequence causing the printer 11 to issue a receipt is divided according to the content of the operation, such as a control command instructing the start of receipt printing, a control command for conveying the thermal roll paper, and a control command for driving the line thermal head. After the recording control unit 42 outputs a control command for conveying the thermal roll paper to the printer 11, it waits for input of a response from the printer 11 reporting the result of the operation based on the control command, and outputs the control command specifying the next operation (such as a control command for driving the line thermal head) after the response is received.

The printer 11 in this embodiment is a printer for issuing receipts by cutting the thermal roll paper at a specific position after recording an image on the thermal roll paper. The last control command output from the recording control unit 42 in the sequence of control commands causing the printer 11 to issue a receipt is therefore a control command causing the cutter mechanism to cut the thermal roll paper, and the first control command output is a control command that starts issuing a receipt.

The operation of the decision unit 44 in this embodiment of the invention is described next with reference to FIG. 3.

This embodiment of the invention differs from the foregoing in the process executed in step SA1.

More specifically, in step SA1 in this embodiment of the invention the decision unit 44 determines if the current time is after the control command that starts issuing a receipt and before the control command for cutting the thermal roll paper is input to the cutter mechanism. If it is (step SA1 returns Yes), the decision unit 44 determines that the USB port 18 cannot be released from the recording control unit 42 (step SA2). Otherwise (step SA1 returns No), the decision unit 44 goes to step SA3.

By thus configuring step SA1, unconditionally releasing the USB port 18 from the recording control unit 42 can be prevented while the sequence of control commands for issuing a receipt are being input from the recording control unit 42 to the communication control unit 16, and errors (problems) resulting therefrom can be prevented.

As described above, the decision unit 44 in this embodiment of the invention determines that the USB port 18 can be released from the recording control unit 42 when it is not in the period after the control command that starts issuing a receipt is input and before the control command for cutting the thermal roll paper is input from the recording control unit 42.

Unconditionally releasing the USB port 18 from the recording control unit 42 can therefore be prevented while the control command sequence for issuing a receipt is being input from the recording control unit 42 to the communication control unit 16, and problems caused by unconditionally releasing the USB port 18 from the recording control unit 42 can be prevented while releasing the USB port 18 from the recording control unit 42 when appropriate.

It will be obvious to one with ordinary skill in the related art that the foregoing embodiment is but one preferred embodiment of the invention, and the invention is not limited thereto. For example, the communication control unit 16 is described above as being rendered as a function module independent of the printer driver 21, but a configuration in which the printer driver 21 includes the function of the communication control unit 16 is also conceivable.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A control device for controlling a printer including a cutting device, the control device comprising:
    a communication port to which the printer is connected, the printer being external to the control device;
    a recording control unit configured to generate and output print control commands configured to control a printing operation by the printer, the print control commands including a paper-cutting command that actuates said cutting device;
    a maintenance unit configured to generate and output a request command configured to request access to the communication port and a maintenance control command configured to control a maintenance operation by the printer; and
    a communication control unit coupled to receive the request command and configured to selectively output the print control command or the maintenance control command to the communication port, the communication control unit including:
        a decision unit configured to determine, when the communication port is occupied by the recording control unit and the request command is received from the maintenance unit, if the communication port can be released from the recording control unit based on a status of the print control command input from the recording control unit, and
        a communication port releasing unit configured to release the communication port from the recording control unit and make the communication port available to the maintenance unit when the decision unit determines that the communication port can be released from the recording control unit;
    wherein the maintenance operation is a print test or operation setting of the printer; and wherein if the communication port is occupied by the recording control unit while the request command is received from the maintenance unit and the most recent print control command output by the recording control unit is not said paper-cutting command, then said decision unit determines that the communication port cannot be released from the recording control unit until the recording control unit outputs said paper-cutting command.

2. The control device described in claim 1, wherein the printer issues a recorded slip by recording an image on paper.

3. The control device described in claim 1, wherein:
the recording control unit stops outputting the print control command when the printer is busy or offline; and
the communication port releasing unit releases the communication port from the recording control unit by generating and outputting to the recording control unit a dummy command imitating a true command from the printer indicating that the printer is busy or offline.

4. The control device described in claim 3, wherein:
the communication port releasing unit generates and outputs to the recording control unit a command indicating that the busy or offline state of the printer indicated by the dummy command is cancelled; and
the recording control unit resumes outputting the print control command in response to receiving the command indicating that the busy or offline state of the printer is cancelled.

5. A control method for a control device that controls a printer, the control method comprising the following steps:
coupling the printer to a communication port of the control device, the printer being external to the control device and having a cutting device;
generating print control commands using a recording control unit internal to the control device, the print control commands being configured to control printing operations of the printer, the print control commands including a paper-cutting command that actuates said cutting device, and the recording control unit occupying the communication port;
sending the print control command from the recording control unit to a communication control unit;
outputting the print control command through the communication port to the printer using the communication control unit when the recording control unit occupies the communication port;
using the communication control unit to determine if the communication port can be released from the recording control unit based on a status of the print control command received from the recording control unit when the communication port is occupied by the recording control unit and a request command requesting access to the communication port is received from a maintenance control unit internal to the control device; and
using the communication control unit to release the communication port from the recording control unit when the communication control unit determines that the communication port can be released from the first recording control unit; and
when the communication port is released from the recording control unit, receiving a maintenance control command from the maintenance control unit and transferring the received maintenance control command through the communication port to the printer, the maintenance control command being configured to control a print test or operation setting of the printer; and
wherein if the communication port is occupied by the recording control unit while the request command requesting access to the communication is received from the maintenance unit and the most recent print control command sent by the recording control unit to the communication control unit is not said paper-cutting command then said decision unit determines that the communication port cannot be released from the recording control unit until the recording control unit sends said paper-cutting command to the communication control unit.

6. The control method of claim 5, further comprising:
generating and sending to the recording control unit a dummy command imitating a true command from the printer indicating that the printer is busy or offline; and
stopping output of the print control command by the recording control unit when the dummy command is received by the recording control unit.

7. The control method of claim 6, further comprising:
generating and sending to the recording control unit a command indicating that the busy or offline state of the printer indicated by the dummy command is cancelled; and
resuming outputting the print control command by the recording control unit after upon it receiving the command indicating that the busy or offline state of the printer is cancelled.

8. The control device described in claim 2, wherein:
the print control commands including a print-record-start command instructing the start of recording on the paper; and
the decision unit determines that the communication port can be released from the recording control unit if said print-record-start command has not been output by the recording control unit.

9. The control device described in claim 1, wherein:
the printer supports a plurality of printer operations each controllable via a corresponding one of a plurality print control commands; and
the print control commands generated by said recording control unit are selected from said plurality of print control commands; and
the recording control unit outputs its generated print control commands to the printer.

10. The control device described in claim 1, wherein said control device is internal to a single computer, and said a communication port, recording control unit, maintenance unit and communication control unit are integral to said single computer.

* * * * *